Figure 1:
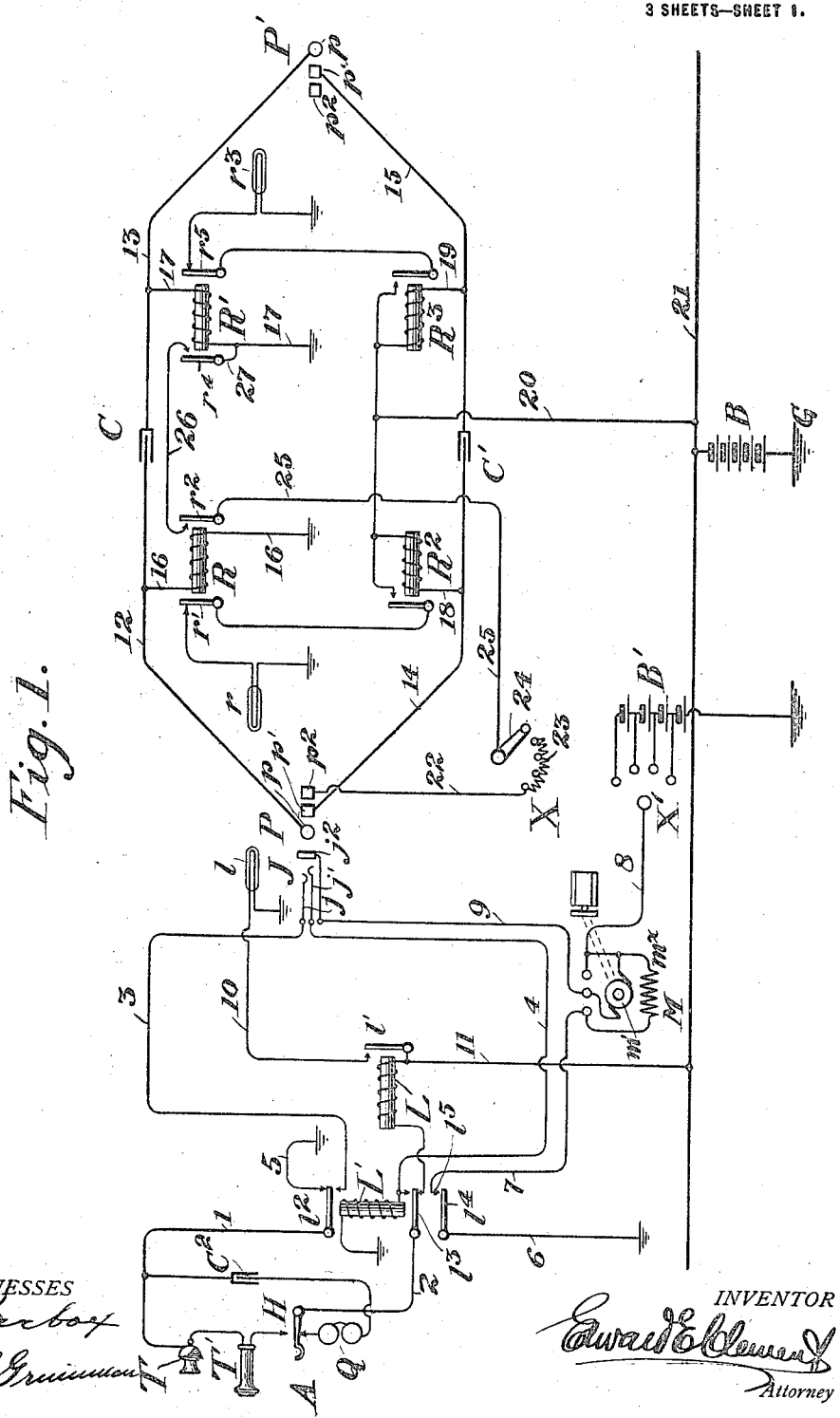

E. E. CLEMENT.
METHOD OF METERING TELEPHONE TRAFFIC.
APPLICATION FILED JUNE 12, 1912. RENEWED DEC. 20, 1916.

1,249,032.

Patented Dec. 4, 1917.
3 SHEETS—SHEET 3.

UNITED STATES PATENT OFFICE.

EDWARD E. CLEMENT, OF WASHINGTON, DISTRICT OF COLUMBIA, ASSIGNOR, BY MESNE ASSIGNMENTS, TO JAMES R. GARFIELD, TRUSTEE, OF CLEVELAND, OHIO.

METHOD OF METERING TELEPHONE-TRAFFIC.

1,249,032.          Specification of Letters Patent.      Patented Dec. 4, 1917.

Original application filed February 23, 1905, Serial No. 247,020. Divided and this application filed June 12, 1912, Serial No. 703,356. Renewed December 20, 1916. Serial No. 138,130.

*To all whom it may concern:*

Be it known that I, EDWARD E. CLEMENT, a citizen of the United States, residing at Washington, in the District of Columbia, have invented certain new and useful Improvements in Methods of Metering Telephone-Traffic, of which the following is a specification, reference being had therein to the accompanying drawing.

My invention relates to telephone systems, and particularly to methods of registering messages and their duration. In registering systems heretofore employed it has been usual to count the number of messages only, and this has been effected in a variety of ways, employing both mechanical and electrical means. While it is true that a so-called "message rate" or metering system of charging for telephone service is a long step in advance of the older "flat rate" methods, it still leaves much to be desired for the following reasons: Given a certain investment in an exchange equipment, it is easy to calculate the total amount to be annually charged as expense. Interest, operation, and maintenance are determinable without difficulty, and the annual depreciation may be approximated with sufficient accuracy for practical purposes. These and similar items being added, the first difficulty is encountered when it is desired to divide the total charges, plus whatever profits or net earnings are assumed, so that the subscribers will get an equitable rate, which shall be proportional in all cases to the amount of service rendered and the use of the equipment. At first sight it would appear that the number of connections called for and completed by each subscriber would afford a ready means of distributing the total charge; but upon reflection it is found this is not so. In the first place, many calls are made which do not result in complete connections. Under the message rate system no charge is made for these. Including "dead head" calls, calls where the line wanted is busy, and those which are lost from any cause, such uncharged messages may amount in a city exchange to twelve per cent. of the total. Without considerable trouble and expense, it is impossible to keep track of this loss. In the second place, there is a marked difference in the duration of messages. In residence districts each use of a telephone is usually of longer duration than it would be in business. The most striking example of this may be found in so-called "visiting" over the telephone, two lines and a switchboard cord with a pair of plugs and their concomitant apparatus being kept busy for an indefinite time during each visit. On the other hand, in a business district the messages are usually very brief, because the lapse of time in each message means a double consumption of money, the subscriber's time being valuable as well as usable time of the telephone apparatus and exchange equipment.

In the third place, most exchange managers depend upon their operators to keep the records of messages received and connections completed. By thus loading additional work on the operators, however, their efficiency is lowered and relatively the cost of their services is increased. Moreover, as in all cases where the human element is employed there is liability of error. To obviate these defects and objections, mechanical and electrical devices have been suggested which would automatically make the necessary records without calling upon the operators for any additional work. So far as I know, however, these devices have failed to remove one principal cause of objection to the system.

By my invention, I aim to remove all the objections stated, and to provide means whereby the total charges may be distributed among the various subscribers in direct proportion to the actual use they have had during any stated period, of the mechanical, electrical, and human equipment of the exchange system.

My invention is particularly applicable to common battery exchange systems, but may be used in magneto systems, and in conjunction with any type of switchboard equipment. In its crudest form, the invention may be described as a system for metering the current supply to the subscriber's lines. Of course in practice it would not be possible to do this literally without a great initial expense, because of the variations in line resistance, etc. In practice therefore, I modify this idea to the extent of employing local circuits for registering, in which the current flow shall be controlled by and proportional to the flow in the corresponding lines. Normally these circuits should be open, and for their closing they should depend upon two factors, a call by the calling subscriber (or the operator's act in response to the same) and the answer by the wanted subscriber. Provision should also be made for suitably increasing the total charge over that shown for completed connections, so as to include for distribution the cost of lost calls, calls for busy lines, etc. As will appear hereafter, I preferably make this addition automatic, and my method may be practised without any of the specific apparatus set forth.

The simplest form of apparatus for carrying out my invention consists of a small electric motor driving a Veeder or other suitable register, and as it is supposed to run continuously whenever its line is connected, the register may be graduated to read in time units, in units of current, in dollars and cents. Instead of these electric motors, a common mechanical motor may be employed, and each line may have its register mounted so as to be properly connected to this motor when its line is in use. Obviously, in the first case, the speed of all the motors can be regulated by changing the current; while in the second case, assuming the mechanical motor to be a driven shaft or the like, the speed at which the registers will run can be varied by simply varying the speed of this shaft.

Suppose every line to be equipped with a motor device after the fashion of the well-known watt meters, the monthly readings will give totals of line-use for the preceding month. The sum of all the line-uses, however, expressed, will be less than the total exchange-use, by reason of the lost and dead-head calls, etc. According to my method, this loss is distributed by raising the voltage or increasing the shaft speed of the registers, so that they will uniformly charge up a total percentage increase over actual line-use sufficient to balance the percentage of exchange-loss. In order to do this it is only necessary to have a common controlling means under control of the manager or other responsible person operating the exchange. The distribution of the increase will automatically take care of itself, and as the percentage of loss for a month would not appear definitely until the end of the month, I have considered that the best and most equitable method of adding and distributing the same would be by correspondingly raising the register speed for the ensuing month. Each month would therefore furnish data for the next month's charges, and as the scheme involves not so much the sale of messages at so much per hundred as it does the distribution of charges and profits proportionately to use of the lines, the subscriber need only receive one contract rate, at so much per unit or per 100 or 1000 units as indicated by the registers. Suppose, for instance, that the registers read in units of time. Assume that a given subscriber has used his line during the month of January an actual total time of one hour and forty minutes; suppose that the percentage of exchange loss for the month is fifteen; the speed of all the subscribers' registers is increased 15 per cent. for February over actual clock time speed, and each subscriber will therefore receive at the end of February a reading charging him with a total time-use equal to 115 per cent. of his actual time-use. Obviously, by adjusting this percentage of increase, all necessary items can be cared for, such as profits, surplus, sinking-fund, interest, depreciation, salaries, miscellaneous expense, etc. By the simple scheme I have mentioned all charges are perfectly and uniformly distributed. For obvious reasons, however, it would be better to have the registers read in units of money than in units of time or other absolute units. Several advantages inhere in such an arrangement. The carrying out of extensions by book-keepers, with its attendant errors is avoided and the subscriber knows, if his rate is so much per minute of actual connection, how many minutes he must have had if his bill is for $4.60. I believe that with this improved method of charging it will be possible for the first time, not to cut rates, but to distribute charges to the same end. By fixing a rate of say one cent per minute within a radius of two miles of the exchange, two cents per minute for four miles, and so on, a business man's messages would average no more than letter postage. Social visiting and long conversations generally would be more expensive, as they ought to be. In its most perfect development, my scheme involves the provision of means whereby connection with different classes of lines will automatically produce different rates of speed in the calling line register. The called line register is never charged for any connection. Again, I provide the operator with means whereby she can determine the rate of a message, that is the speed of a register, by pressing a button or moving a switch handle. Suppose, for instance, that a subscriber's operator can give three classes of service, viz., local, toll-board, and long distance. She may set a rheostat in her cord-circuit according to the connection desired, and when the same is completed the speed of the calling line register will be determined accordingly. Better than this, however, is an automatic regulation to which I have referred, and in such case the toll operator or long distance operator would necessarily be provided with speed regulating means to be set in accordance with her various rates.

The present application is a division of my prior application filed February 23, 1905, Serial No. 247,020. In that case I claimed the apparatus, and in this I claim the method of operating, only.

Figure 2:
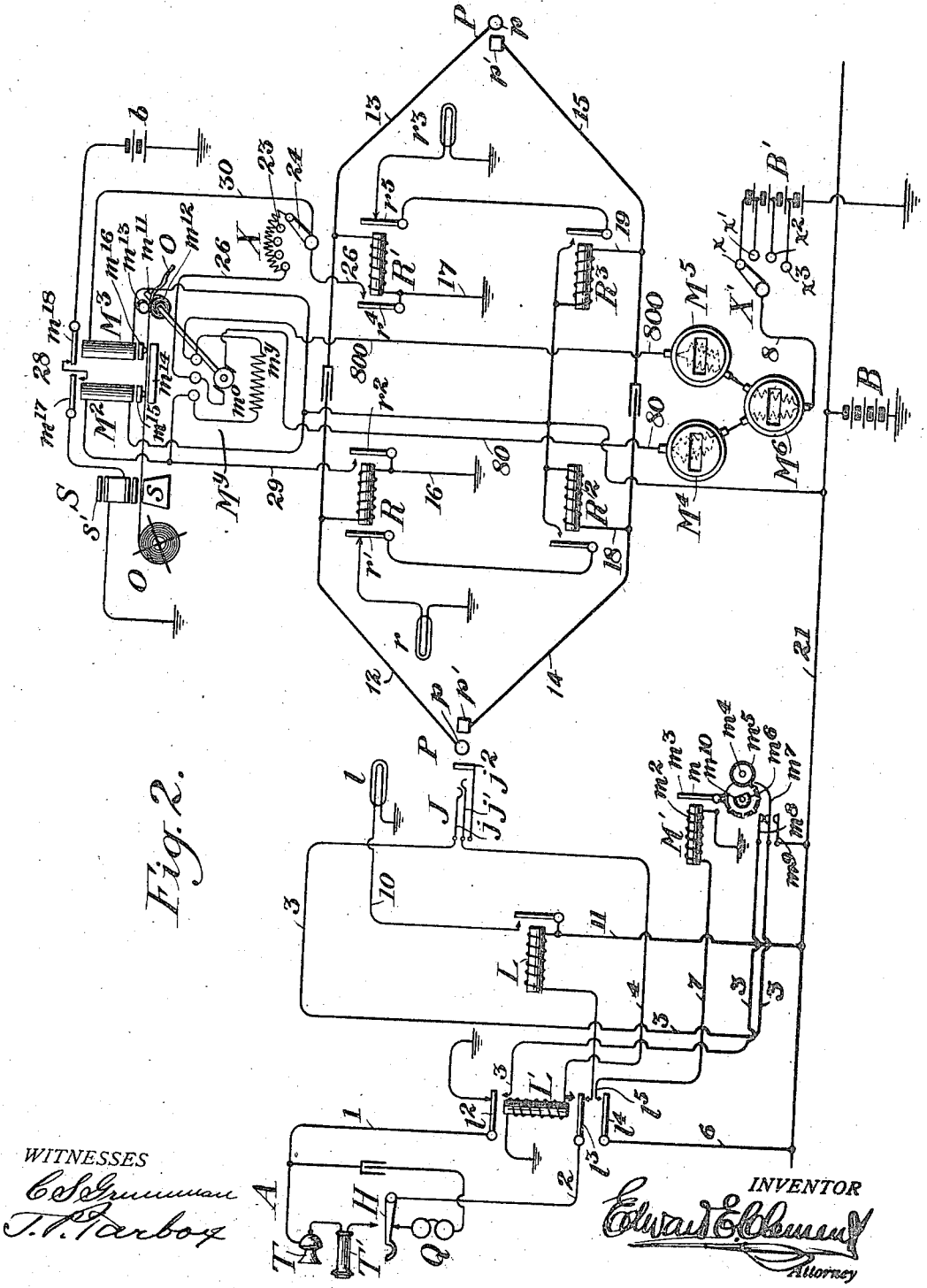
Figure 3:
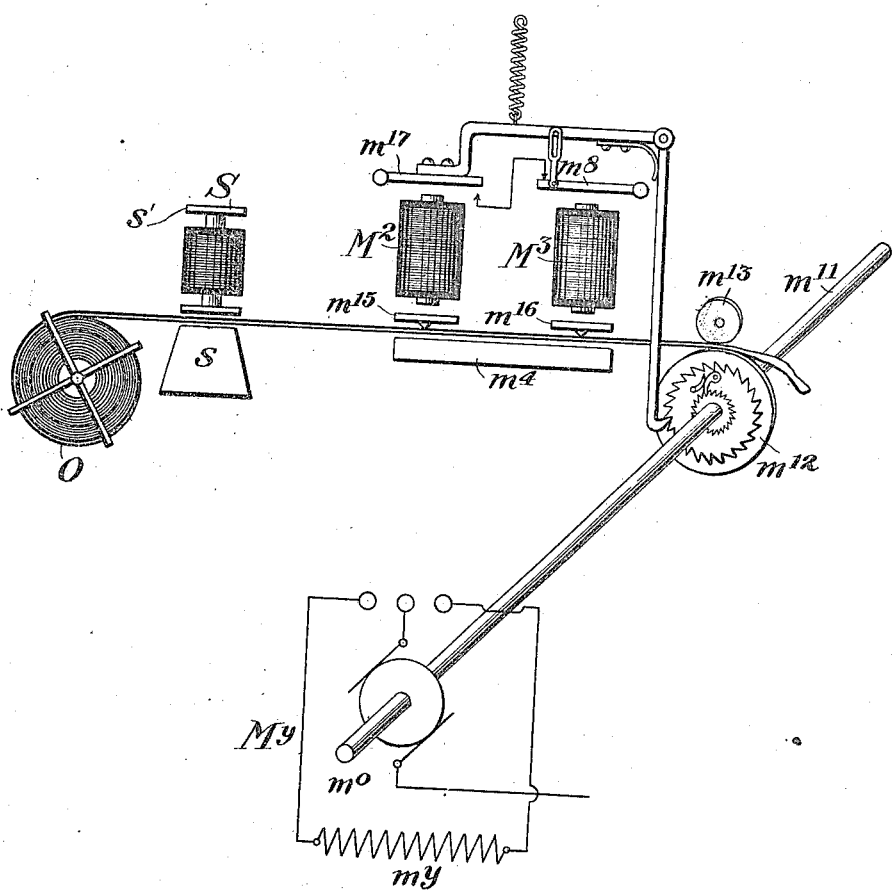

In the accompanying drawings I have illustrated one form of apparatus and one arrangement of circuits whereby my invention may be practised. I do not wish in any sense to limit myself thereto and thereby, but I present this as the simplest, and for this first development of the invention the best embodiment of which I am at present aware. Figures 1 and 2 are diagrams of exchange systems, and Fig. 3, is a diagrammatic view of a form of tape feeding mechanism.

In Fig. 1, a standard common battery system is used for illustration. A is a subscriber's station equipped with apparatus usual in common battery systems. The line from this station terminates in a central office at a jack. As the apparatus for all stations at central is similar, only one station is shown. L is the line relay having the armature $l'$ which controls the line lamp $l$. This relay in turn is controlled by the cut-off relay $L'$ which also jointly controls the register M. The armature winding $m'$ of the register M is connected to the ring $j^2$ of the jack J by wire 9. The field winding $m$ is connected to the contact $l^5$ in the cut-off relay $L'$, the armature and field $m$ and $m'$ being both connected permanently to battery on the other side, preferably through the common return and the main speed controlling device $X'$ I have referred to. The cord circuit consists of the answering plug P and calling plug $P'$, each with a tip $p$, ring $p'$ and sleeve $p^2$. The tip and ring contacts of the respective plugs are connected by the cord conductors 12—13, 14—15, broken by condensers C and C' to permit double supervision. Supervisory relay R and controlling relay $R^2$ are connected from battery to the opposite cord conductors 12 and 14; and corresponding relays $R'$ and $R^3$ to the conductors 13 and 15. Sleeve $p^2$ of the calling plug $P'$ is open, but that of answering plug P is connected by wire 22 to resistance coils 23 of the rheostat X, by switch-arm 24 and wire 25 to relay armature $r^2$, wire 26, armature $r^4$ and wire 27 to 17 and battery to ground.

The operation of this form of my system is as follows:

Supposing subscriber A calls for another subscriber. By removing his telephone he signals central, closing thereby the circuit of the line relay L through the contacts of the cut-off relay $L'$, and causing the line lamp $l$ to glow. The operator perceiving the signal inserts the answering plug P into the jack J. This causes battery to flow through the controlling relay $R^2$ and the cut-off relay $L'$ in series, by the path 20—$R^2$—14—4. The relay $L'$ then attracts its armatures, cuts off the line relay L, which extinguishes the lamp $l$ at the same time it also causes the armature $l^4$ which is grounded, to close on contact $l^5$, connected to the field $m^x$ of the register M, energizing said field $m^x$. The field $m^x$ while energized, does not cause the armature $m'$ to revolve, as the circuit of the armature remains to be completed through the contact of the armatures $r^2$ and $r^4$ of the supervisory relays R and $R'$. The armature of the relay R is attracted when the operator answers the call. The operator then inserts the calling plug $P'$ into the jack of the wanted subscriber, and calls said subscriber in the usual manner. The insertion of the plug energizes the cut-off relay which attracts its armature and cuts off the line relay of the called line. The armature winding of the register of the called line is connected to the ring $j^2$ of its jack, which is not closed to complete the circuit of the register as the calling plug $P'$ has no third conductor. Upon answering, the called subscriber closes his circuit for battery current through the supervisory relay $R'$, which then attracts its armature $r^4$ and closes the circuit of the calling register, M. The armature $m'$ then begins to revolve and indicates until either or both of the subscribers hangs up. The register M is not controlled by the operator but automatically by the subscribers and cannot be made to indicate unless both subscribers have their telephones down. Supposing at the end of the conversation the called subscriber should hang up his telephone, the armature $r^4$ of the relay $R'$ would immediately fall back and break contact which would open the circuit of the armature $m'$ of the register M. If, instead, subscriber A should hang up his receiver first, the armature $r^2$ of the relay R would break the connection in the same manner. At the end of the conversation both subscribers hanging up their telephones, the relays R and $R'$ become simultaneously deënergized, and their armatures falling back upon the circuit of the armature $m'$ and at the same time cause the lamps $r$ and $r^3$ to glow. The operator noticing this withdraws the plugs as usual. When the answering plug P is withdrawn the armature of the cut-off relay $L'$ is retracted and opens the circuit of the field of the register. The moment the circuit of the register was broken by the subscribers hanging up their telephones it ceased to indicate. The register proper is preferably made in the form of a cyclometer register but any convenient form can be used as desired. The registers should be mounted in banks or tiers on racks in a suitable place. At the end of the month, quarter or other stated time, readings should be taken and the subscribers charged with the time, amount or quantity of current whichever is indicated.

In Fig. 2 I have shown a preferred modification of my invention, wherein and whereby I avoid the necesity for individual registers, and provide only one register for each cord circuit or equivalent connective device. Moreover, I avoid the use of any extra apparatus except that connected with the register itself, and do not complicate the ordinary cord circuit apparatus.

Referring to the drawing, the subscriber's station apparatus is the same as in Fig. 1, and the line wires 1—2 come into the central office and terminate on the contacts $l^2$—$l^3$ of the cut-off relay L', as before. The transmitter T, receiver T', ringer Q and switch-hook H at station A need no detailed description. When the cut-off L' is energized it connects the line wires 1—2 to the jack wires 3—4, and when deënergized connects the line wires to the line relay L and ground as shown. When this cut-off relay is energized it does another thing, however, that is, it connects a means to identify the line calling, which is obviously necessary where there is not an individual register for each line. In the present case, I have somewhat modified this portion of the apparatus, first because I wish to have the number-wheel connection controlled by the cut-off relay, and second because I wish to simplify the jack. It should be understood that while in both the figures herein I have illustrated only one jack for the subscriber's line, there may be and preferably will be in practice multiple-jacks for each line, with their test-thimbles connected together for the usual test purpose. The circuit I have chosen for the lines and connecting cords, for purposes of illustration herein, is a standard form of two-wire common battery circuit. It will be noted that I have added no relays or their controlling apparatus to either line or cord, depending entirely upon the usual cut-off and supervisory relays. Each of these is provided with a special contact, which in practice would be an extra pair of contact springs operated by the regular armature.

In Fig. 2, a common driven shaft $m^4$ carries a series of toothed gears $m^5$, and with each of these is adapted to mesh a mutilated pinion $m^{10}$ attached to a number-wheel $m^6$, both the wheel and pinion being carried upon a stud mounted on the lower end of a swinging armature $m^3$ controlled by the electro-magnet $m^2$ of the individual line identifying device M'. This magnet is grounded on one side and on the other is connected by a wire 7 to the contact $l^5$ of the armature $l^4$ of the cut-off relay L', the circuit of each magnet $m^2$ being completed to the battery B through wire 6 when the cut-off relay is energized.

Each line circuit has extensions 3 and 4 extending from the front contacts of its cut-off relay to the jack-springs $j$ and $j'$. The extension 3 of each line, however, before passing to the jack, extends to a spring $m^8$ of the individual device M', normally in contact with a twin spring $m^7$, and thence to the jack. The spring $m^7$ is permitted to rest normally in contact with spring $m^8$ by reason of its tip resting in a notch in the toothed wheel $m^6$, but when the wheel is turning the spring is lifted out of this notch to break the normal connection, and as the tooth of the wheel passes under the spring the latter is forced over against a battery spring $m^9$, directly connected to the bus-wire 21 of the main battery B. When the magnet $m^2$ is energized it draws over its armature and throws the pinion $m^{10}$ into engagement with the standard revolving gear $m^5$, whereby the pinion and the connected wheel $m^6$ are turned, and the extension 3 of the line is broken, the jack end being connected to and disconnected from the main battery as many times as there are teeth on the periphery of the wheel. These makes and breaks affect the supervisory relay R, and are recorded thereby, in a manner to be presently described. The number is only transmitted and recorded once, by preference, or at least the movement of the wheel $m^6$ is limited by the mutilation of its pinion, so that after the mutilated portion in turning reaches the gear-wheel $m^5$, the wheel $m^6$ stops, and permits the pen or spring $m^7$ to resume its normal engagement with the spring $m^8$, closing the line to the jack. By virtue of the unbalanced condition of the pinion $m^{10}$, due to its cut-away or mutilated portion, it automatically drops into its normal position upon disengagement from the gear $m^5$.

I do not wish to limit myself in any wise to this form of device M', as there are many similar devices which may be substituted and which are within the knowledge of those skilled in the art.

Referring now to the register mechanism for the cord-circuit, this comprises the register motor M$^y$ having a field-winding $m^x$ and an armature $m^o$, and a pair of register magnets of the Morse register type, M$^2$ and M$^3$. The registration of calls is performed upon a paper tape or similar moving surface. The register M$^2$ marks upon this tape the number of the line calling, the register M$^3$ marks the number of the line called, and the motor M$^y$ feeds the tape continuously as long as both supervisory relays R and R' are energized, which is only while the connection between the lines is completed and both subscribers have their telephones off the hooks. The arrangement here illustrated is selected as the simplest embodiment of my idea, for the purposes of this application. The idea itself, however, is capable of a number of embodiments, and is not at all restricted to a manual system, being equally applicable to automatic or semi-automatic systems, as will be pointed out. The root of the idea is in this, that it is possible by taking some distinctive portion of a line and some similarly distinctive or characteristic portion of the connective circuit which are brought into a conjugate relation during connection between lines, and then by connecting register apparatus so as to be jointly controlled by these two portions or elements, to effect a record of the connection, of the particularly connective apparatus employed therein, and of the particular line or subscriber calling or called. This, in one embodiment, as shown in Fig. 2, or in other embodiments which I shall point out herein constitutes a step in advance over the simpler scheme in Fig. 1. Stated briefly, and as to essentials only, Fig. 1 presents only one-half of the complete idea, in that the line is segregated for purposes of record, but the connective circuit is not. In either case, as I shall show the particular type of motor, or the particular type of register, employed, is a matter of indifference, being largely regulated by expediency or economy. Thus, in Fig. 2, I show a mechanically driven shaft $m^4$ for the number-wheel indicator $M'$. The motor M or $M^y$ in either Fig. 1 or 2 may similarly be replaced by a mechanical shaft or other motor driven in any desired manner, but preferably at a constant speed. This speed regulates the rate of charging for the service given, and as I have already pointed out it can be changed to raise or lower the rate and thereby cover losses or profits as desired.

As shown in Fig. 2, the register outfit comprises the tape O, and the electric motor $M^y$, with the registers. The cord-circuit itself is the same as in Fig. 1, including the answering and calling plugs P and P', whose tips and sleeves are respectively connected through cord-conductors 12—13 and 14—15, each conductively divided but inductively completed by a condenser. The cut-off relay L', of each line, is in a ground branch from the sleeve side 4 of the line. In each cord-circuit controlling relays $R^2$ and $R^3$ are connected respectively to the sleeve strands 14 and 15 by wires 18 and 19, and in common to the battery. When either plug is inserted in a jack, therefore, its controlling relay and the cut-off relay of the line are brought into series relation with the battery and are energized, the controlling relay thereupon completing the circuit of its supervisory lamp $r$ or $r^3$, subject to the control of the supervisory relay R or R'. These latter relays are in branches 16 and 17 extending from the tip-strands of the cord to ground, and except when affected by the line identifying means M', they are under the control of the line and the subscriber only. Each supervisory relay has an armature $r^2$ or $r^4$, adapted when attracted to connect the wire 29 or 30 to ground and thence to battery. The wire 29 has two branches, one of which extends to the register magnet $M^2$ and thence back to the main battery B, and the other extends to the field-winding $m^y$ of the motor $M^y$, and thence by wire 800 through the special meter $M^5$ and one side of the general or common meter $M^6$ to wire 8, which in turn is connected to the switch-arm of a voltage regulator X', adapted to sweep over contacts $x$, $x'$, $x^2$ and $x^3$, connected to different points of the secondary or register battery B'.

The wire 26 of the supervisory relay R' is also branched, one part extending through the rheostat X, whose switch-arm 24 or equivalent operating device is within reach of the operator, and then as shown to the armature $m^o$ of the motor $M^y$, connected on the other side to wire 80, and thence through the special meter $M^4$ and one side of the common meter $M^6$ to the wire 8. The wires 80 and 800, as well as the regulator X', are supposed to be common to the entire exchange. It will be observed that whenever a line calls and the call is answered, the relay R gets current, and the circuit of the register-field $M^y$ is closed. Whether one or twenty of these circuits is closed at once, the meter $M^5$ will register the amount of current taken, any units being employed which may be found desirable. Readings taken off the meter $M^5$, for any given period, will show therefore totals proportional to the total line-use of all calling lines during that period, whether the connections were completed or not. The wire 80, on the other hand, being a common return for all of the armature circuits of the motors $M^y$ and these getting current only when the called subscriber's supervisory relays R' are energized, readings taken off the meter $M^4$ will give totals proportional to the line-use of all called lines which have answered the calls. These two meters $M^4$ and $M^5$ may have their units arbitrarily selected, a standard type of watt meter being advantageously employed. If they are calibrated with uniformity, the difference between their simultaneous readings will be proportional to the exchange loss.

The common meter $M^6$, however, registers the resultant of the two current quantities independently metered by the machines $M^4$ and $M^5$. While the readings of the latter, therefore, are relative only, the readings of the meter $M^6$ are in a sense absolute, for if the machine is properly designed and calibrated, and its unit indications are properly selected, its readings will at all times show the totals of the exchange business. This meter can advantageously be made to read directly in dollars and cents, and by it the exchange manager or the treasurer, or other responsible officer of the operating company can keep a constant check on efficiency and the total exchange-use. With these three meters, a constant recapitulation of the exchange business is obtainable, and by adjusting the voltage in the register circuits, through the regulator X', the manager can adjust his rates and maintain an even and equitable distribution.

It is to be particularly noted that the mere number of calls made or calls answered has nothing to do with the operation of the meters $M^4$, $M^5$ and $M^6$, or rather this alone does not regulate the proportional records. Even the time or duration of connections by itself does not determine the proportional record. In each armature circuit 26 is included the individual rheostat X, whereby the operator determines the rate to be charged for a particular message, that is to say the amount of current which shall pass through the register armature during the continuance of that connection. The current flow during different connections will thus be different, the normal or minimum flow being through the entire length of the resistance coils 23, with the arm 24 in the position shown. This position is maintained for all local connections, we will say. For a ten cent charge the arm 24 is moved up one notch, thereby cutting down the resistance and increasing the current, increasing the speed of the armature $m^o$, and increasing the current passing through the meter $M^4$. For a long-distance call, or a more extensive toll message, the arm 24 would be pushed up still farther, according to the rate. It should be noted here that these variable quantities are all on the called side, and affect the totals of meter $M^4$ only. Line-use of calling lines is at a constant rate, but line-use of called lines is at a rate determined by the character of the line called, and the final total registration by meter $M^6$ represents with absolute fidelity the resultant of these three components: (1) line-use of the calling lines; (2) rate predetermined for the called line; and (3) line-use of the called line. Moreover, the cord-circuit registers charge up against the calling subscriber the resultant of these three components of each call, accurately and without discrimination.

With this system therefore, it will be observed that for the first time it is possible to comply absolutely with the equities in adjusting charges. It is possible to determine the total cost for a given period of the exchange service, to add to this the amount of profit or net earnings permissible, and then to distribute the total among the subscribers with absolute fidelity in exact proportion to the amount of service rendered each one. Assuming that the meter $M^6$ is made to read in dollars and cents, and that the gross earnings for a given month must reach a certain figure, it is necessary only to adjust the regulator X' in order to prevent the actual gross earnings as indicated by the meter from exceeding the desired figure. The regulator not only holds down the meter $M^6$, but also holds down each and every subscriber's account proportionally.

Returning to the specific structure of the cord-circuit regulators, the armature $m^o$ of each register has a shaft indicated diagrammatically at $m^{11}$. This shaft carries a feed-roller $m^{12}$ between which and a friction roller $m^{13}$ the tape is led. The tape is carried upon a spider, and first passes over the dial block $s$ of a time stamp S, then beneath the markers $m^{15}$ and $m^{16}$ of the registers $M^2$ and $M^3$, overlying their platen $m^{14}$, and then to the feed-rolls. The operation of the time stamp is controlled conjointly by the two register magnets. This time stamp is designed to be slow to operate and quick to restore which effect may be accomplished in any well known manner as by the use of a solenoid and dash pot. When a call is answered by the insertion of answering plug P, and after the relay R and magnet $M^2$ have been intermittently energized to register the calling subscriber's number, relay R becomes continuously energized and continuously closes the circuit of magnet $M^2$. The magnet $M^2$ now holds down its armature $m^{17}$ continuously and completes a relatively long closure of the circuit from battery $b$ through the yoke-wire 28 to the solenoid of the time stamp S which, being sluggish and responding only to such a relatively long closure of its circuit, now pulls down its armature $s'$, whose connected foot platen presses the tape down on the dial-block and marks the time on the underside of the tape. The register magnet $M^3$ permits this actuation of the time stamp when a call is made only, and at no other time, and after the calling subscriber has answered the armature $m^{18}$ is held attracted, and when both subscribers have finally hung up their receivers, both armatures $m^{17}$ and $m^{18}$ go back. If it should happen that the called subscriber should hang up first, a repetition of the time stamp might result, but this would not be confusing because it would be unaccompanied by a register number, which alone indicates a fresh call.

The length of the tape fed through during each connection, by the operation of the motor $M^y$ is proportional to the duration of the connection. At the end of a day all tapes should be changed from the registers and cut up, according to the record of calling subscribers. All the pieces of tape bearing the number of the same subscriber should be pasted together, so as to make a continuous tape, and at the end of a month, therefore, or other stated period, each subscriber's tape by its length alone furnishes a measure of his line-use during the month, and by simply running the tape through a measuring device, such as is used for measuring the length of cabling or wiring, the charge against the subscriber can be determined mechanically. The indicator through which the tape is run to measure its length can have its dial graduated directly in dollars and cents, and by this part of my method all computation and the carrying out of extensions by book-keepers is done away with, with its attendant errors. The amount indicated is printed, either automatically by the registering machine, as usual in cash registers, or by hand, upon the exposed end of the tape when rolled up. Each tape being marked with the name or number of the subscriber, it then becomes mere copyist's work to make out the bills.

The simplicity and perfect flexibility of this system will be realized when it is considered that the length of the tape, being regulated by the speed and total revolutions of the motor $M^y$, represents the resultant of the three component factors I have mentioned in the foregoing. Hence, there is no figuring or adjusting of any kind, character or description in connection with any subscriber's number; and if any dispute whatever arises, the original record is available, which gives the following data for each call: The number of the line calling, the number of the line called, the time of the call, the condition of the line called, if busy, and the duration of the connection. With all this information, available in detail for reference if desired, and mechanically summarized for ledger entries and rendition of bills, there are only two operations requiring hand work and some simple degree of head work, viz., the chopping up and pasting of the tapes, which is boy's work, and the writing of the bills which is purely copying on the typewriter.

The operation of the apparatus heretofore described is as follows:

Referring to Fig. 2, subscriber A calls, lamp $l$ lights, plug P is inserted, and relays $R^2$ and $L'$ pull up as before. Circuit for magnet $m^2$ is completed as follows: Battery B, 21, 6, $l^4$, $l^5$, 7 $m^2$ and ground back to battery. This throws the multilated pinion $m^{10}$ against the gear $m^5$, the number-wheel revolves, and current impulses corresponding to the number of the line calling are sent over wires 3 and 12 to the supervisory relay R, which correspondingly makes and breaks the circuit 29 of register magnet $M^2$, whose first movement in pulling up when the plug is so inserted has stamped the time, and whose subsequent movements print on the breaks the number of the line calling on the tape. For simplicity I have not shown any feed mechanism for the shaft $m^{11}$ controlled by the magnets $M^2$ and $M^3$. In practice, each of these magnets when printing steps the shaft around, preferably by means of a ratchet to space the marks, as shown in Fig. 3. Instead of thus stepping, the two registers $M^2$, $M^3$ may constitute a double Morse register of standard type, having normally wound clock-work of the register or the motor $M^y$ then feeding the tape according to which is running.

The number having been printed, the calling line is again completed, and the calling-plug P′ is inserted in the wanted line-jack. This line having the same apparatus as that shown on the left of Fig. 2, the line number is immediately transmitted back through the cord-strand 13 to the relay R′, which causes register magnet $M^3$ to print the number of the line called on the tape. After sufficient time has elapsed for the latter registration, the operator rings the called subscriber in the usual manner. During the ringing the cord circuit strands 13 and 15 are preferably broken to prevent ringing back, an ordinary ringing key of well known manual type, or any other preferred arrangement, being used for this purpose. In the drawing, two register magnets $M^2$, $M^3$ are shown arranged tandem. In practice, the marking pens would be side by side, and the number of the line called would always be on the opposite edge of the tape from that of the line calling, or on the opposite side, or otherwise distinguished. The feed roller $m^{12}$ is preferably provided with one ridge or tooth which will make recurring marks on the tape as it is fed through, each mark representing one rotation of the shaft $m^{11}$, and consequently a definite period of time. This is merely for convenience, however, as the length of the tape determines the elapsed time.

It is to be understood that I do not confine myself to the use of a shunt-wound motor, or indeed to the separate control of the feed and armature circuits by the supervisory relays. In Fig. 1, I have shown a field controlled by the cut-off relay and the armature by the supervisory relays, controlling contacts in series. As well known in the case of shunt-wound motors, the weakening of the field might produce a higher rate of registration, and in case of residual magnetism with current flowing in the armature, an injustice might be done the subscriber. In practice, therefore, it may be best to substitute the series control by the supervisory relays as shown in Fig. 1 for the parallel control shown in Fig. 2. The special meters M⁴ and M⁵ would still be separately controlled in order to give the proper readings.

All of the foregoing, and many other modifications, can be made without departing in any sense from the spirit of my invention. Moreover, while I have not described many details of the apparatus, preferring to leave such details to the individual designer, yet I intend all these details, according to the usual and accepted practice, to be read into this case. It may be necessary to make the wheel $m^6$ in Fig. 2, or the other parts therein shown, of a special form to get the best results. I do not pretend in this specification to set forth all such details, but I contemplate including all of them in my system, while limiting this description so as to impart the novel principles involved, their means of embodiment, and the arrangement for attaining the best results.

In semi-automatic systems, in which cord-circuits are used, double supervision the same as in straight manual systems, the mode of application is unchanged. In fact, in any system where there are two relays, one responding to changes in the calling subscriber's line and the other to changes in the called subscriber's line, my invention may obviously be practised without special change.

In full automatic systems, it is only necessary as above stated to have two distinctive controlling magnets.

In semi-automatic systems wherein the lines terminate in some sort of automatic apparatus for selecting an idle cord or connective circuit, this system is particularly desirable in the form shown in Fig. 2, although either scheme as herein developed can be applied without difficulty, and in a manner obvious to those skilled in the art.

Having thus described my invention what I claim and desire to secure by Letters Patent is—

1. The method of metering telephone service in an exchange system which consists in (1) causing a constant flow of electric current in each of two connected telephone lines in joint use; (2) causing said separate flowing currents to react against each other so as to produce a resultant dynamic effect coextensive in duration with the joint current flow, and (3) causing a continuous sensible registration coextensive in duration with said dynamic effect, whereby the duration of line use may be directly measured.

2. The method of metering telephone service in an exchange system which consists in (1) causing a constant flow of electric current in each of two connected telephone lines in joint use; (2) causing said separate flowing currents to react against each other so as to produce a resultant dynamic effect coextensive in duration with the joint current flow; (3) causing a continuous sensible registration coextensive in duration with said dynamic effect, whereby the duration of line use may be directly measured, and (4) integrating succeeding dynamic effects in continuous summatic relation, whereby total line use for a given period may be directly measured.

In testimony whereof I affix my signature in presence of two witnesses.

EDWARD E. CLEMENT.

Witnesses:
 JOHN P. TARBOX,
 JAMES H. MARR.